T. A. EDISON.
ELECTRO-HARMONIC MULTIPLEX TELEGRAPH.
No. 185,507.      Patented Dec. 19, 1876.
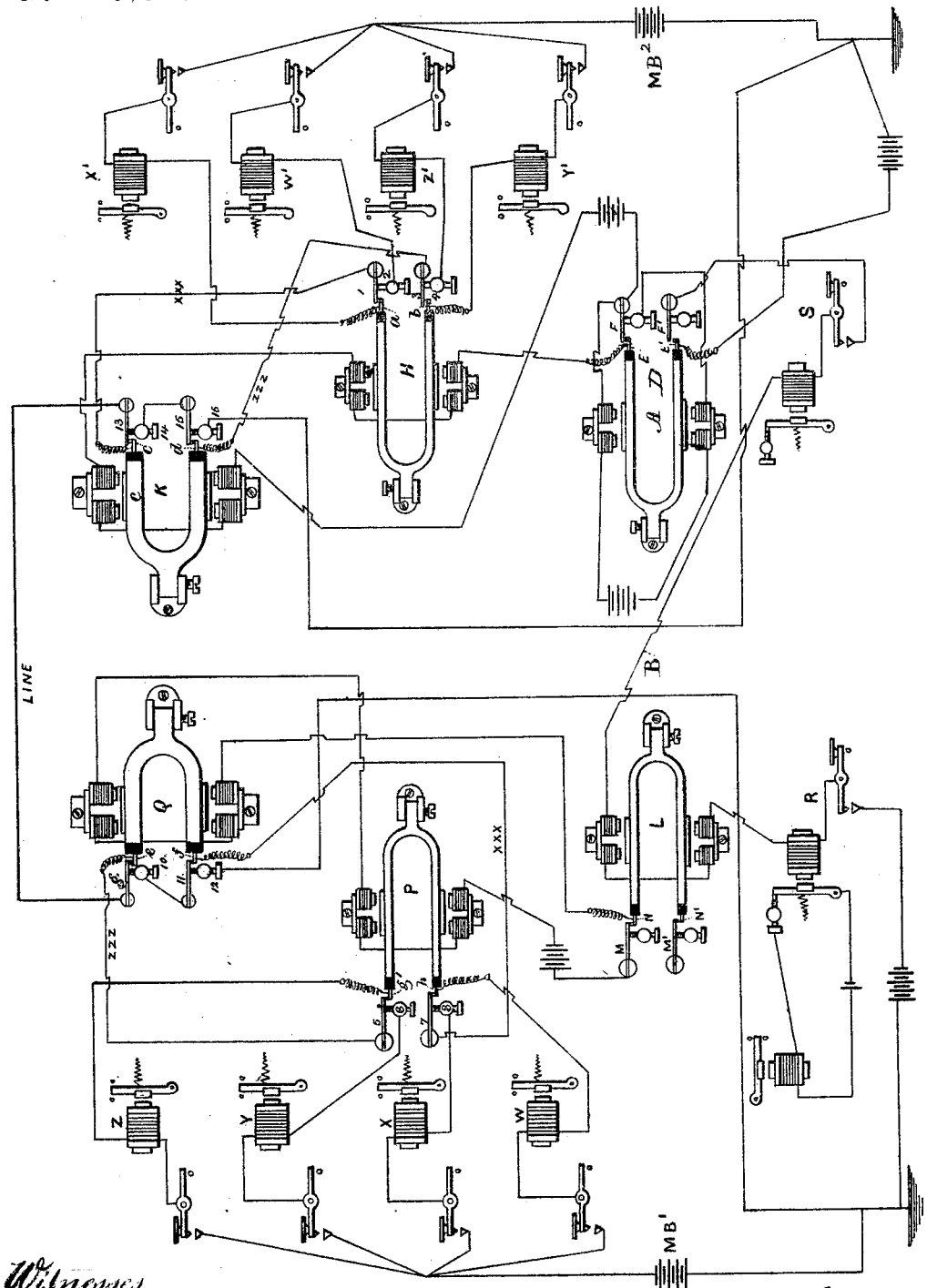

UNITED STATES PATENT OFFICE.

THOMAS A. EDISON, OF MENLO PARK, NEW JERSEY, ASSIGNOR TO WESTERN UNION TELEGRAPH COMPANY.

IMPROVEMENT IN ELECTRO-HARMONIC MULTIPLEX TELEGRAPHS.

Specification forming part of Letters Patent No. 185,507, dated December 19, 1876; application filed August 31, 1876.

*To all whom it may concern:*

Be it known that I, THOMAS A. EDISON, of Menlo Park, in the State of New Jersey, have invented an Improvement in Acoustic Telegraphs, of which the following is a specification:

The object of this invention is to subdivide a single telegraphic circuit into a number of independent signaling-circuits, each of which may be operated by means of the signaling apparatus in ordinary use, and signals transmitted upon each signaling-circuit without interfering with the others, and in either direction at pleasure.

The invention consists, first, in a method and combination of apparatus for transferring a telegraphic line or circuit at two or more stations, either terminal or intermediate, successively from one set of signaling-instruments to several other sets of signaling-instruments, by the use of tuning forks or reeds at each station, kept in continuous vibration, by electro-magnets, with such rapidity and in such a manner that the brief time during which the circuit is disconnected from any one pair of signaling-instruments and returned thereto is not sufficient to interfere with the proper transmission of signals.

Second, the invention further consists in placing in the same circuit two tuning-forks or equivalent devices, one of which, in respect to the number of its vibrations in a given time, is a submultiple of the other, so that the high forks shall subdivide the wire into two signaling-circuits, which latter, being connected to the low fork, are thereby again subdivided into four signaling-circuits.

Third, the invention further consists in the method and combination of apparatus employed to control and regulate the transferring forks or reeds by means of the other tuning-forks, reeds, or moving bodies following the law of the pendulum, which are actuated by electro-magnets placed in a second circuit, and arranged to close at each vibration the local circuit, by which the transfer-forks are kept in vibration.

Fourth, the invention further consists in a method and combination of devices whereby the transferred circuit is momentarily connected to the earth during its passage from one set of signaling-instruments to another.

Fifth, the invention further consists in the combination of transfer-reeds, together with their signaling-instruments, local circuit, and batteries, with the main-line reed or reeds, by which means the accurate transfer of the main circuit upon the several instruments is effected.

Sixth, the invention further consists in the combination of signaling-instruments with the auxiliary or controlling circuit, in such a manner that it may be utilized for the transmission of signals, as well as for controlling the apparatus attached to the other line.

Seventh, the invention further consists in the placing of several sets of electro-magnetic transfer forks or reeds in the same local circuit at each of the different stations, whereby they are maintained in harmonious vibration with each other at all times.

I will now describe the various devices. A is the fundamental fork, which may either be in the main circuit of the controlling-line B, or in a local circuit. I have shown it in the latter. The fork makes, say, thirty-six vibrations in each second. (I do not confine myself to thirty-six, as twelve to five hundred will answer.) D is the contact devices, whereby the circuit in which the actuating-magnets are placed is opened and closed at each vibration, thus causing the reed to vibrate continuously. Upon the extreme ends of the prongs are insulated contact-points E and E', which come in contact with springs F and F'. The contact of E and F serves to close and open the local circuit, in which the transfer-reeds H and K are placed, while the contact of E' and F' serves to close and open the controlling-circuit. This sets the fork L in motion, which, in its turn, by means of M and N, closes and opens the local circuit in which the forks P and Q, are setting them in motion. Now, if the contact time of the various springs and points upon the controlling-forks A and L is the same, the forks H, K, P, and Q will vibrate exactly in unison, and continue to do so, although a great variation may take place on the controlling-wire, in which A and L are placed. R and S are two signaling-instruments, which are ordinary Morse apparatus, with the exception of the relays and keys having back points, the signaling-sounder closing when the circuit is opened by depressing the keys.

I will mention that signaling may take place at the same time that the fork L is working without interruption to it, as it requires from fifteen to twenty-five seconds after the controlling-wire is opened before its vibration becomes insufficient to open and close the circuit of the forks P and Q, and as a Morse signal only requires a fraction of a second, these slight openings do not interfere with the fork.

I will here mention that the signaling might be done by cutting in and out resistance by the keys, or by the insertion and withdrawal of an extra battery by the same means; but I prefer to use the method shown.

It is even possible to transfer the controlling-circuit to the signaling-instrument R and S at that moment when the controlling-line is to be opened, the same effect as opening being obtained by polarizing the armatures upon the forks, so that they will respond to a positive current, and causing magnetic effect to cease by cutting in the circuit the signaling-instrument and a negative battery.

The points M' and N' of L may be used to open and close another local circuit containing another set of forks, which can be used for another line, extra points of course being added to A to work a similar set of forks.

Having now described my method of obtaining a perfect synchronous vibration of the several forks at the terminals, I will now describe how the second circuit is transferred upon the several signaling-circuits simultaneously.

The line to be transferred is connected first to the springs $g$ of fork Q and 13 of fork K. The springs 11 of Q and 15 of K are also connected to the line, when $g$ and 13 rest against the limiting-points 10 and 14. The points 12 of Q and 16 of K are in connection with the earth. When the forks Q and K are not in vibration, the springs $g$ and 11 of the former and 13 and 15 of the latter are not in contact with either $c$ $d$ of K or $e f$ of Q, they being so adjusted that the prongs must reach a considerable amplitude before they are brought in contact. This allows the wire to be put to earth at both ends—for instance, starting from the left, and proceeding toward K, the line enters the spring 13; thence, through to point 14, to spring 15; thence to point 16, to earth; from earth at the receiving-station to the point 12 of Q; thence, via spring 11, to point 10; thence to spring $g$, to line, thus putting the line to earth each time that the forks Q and K vibrate, and at that period of the vibration when they are in the position they would be if in a state of rest. If, now, both forks vibrate, $c$ and $e$ will be brought in contact with springs 13 and $g$, thus disconnecting the line from earth, and throwing it to the forks H and P, whose action will be presently described.

While this contact continues the other prongs of Q and K recede from 15 and 11, and perform no work. On the return of $c$ and $e$, the springs $g$ and 13 rest for a moment upon 14 and 10, and as 15 and 11 are, at the particular period, and for a time afterward, in contact with 16 and 12, the line will be put to earth in the manner before described, and will continue in this way until the prongs $d$ and $f$ come in contact with the springs 15 and 11, separating them from the earth and connecting them to the reeds H and P. Thus it will be seen that the line is split in two parts and put to earth at that period of time when neither H or P are in connection with it.

Having now shown how the wire is split into two parts, I will now describe the method of still further subdivision.

The wires from $e$ and $f$ of Q and $c$ and $d$ of K proceed to springs 1 2 of H and 5 and 7 of P. $g'$, 6, 8, and $h$ of P are connected to the signaling-instruments W X Y Z and their keys and battery M B', and the same connections are made with H.

The operation is as follows: When $g'$ of P is in contact with 5, 6 of $h$ is in contact with 3. At the same instant that contact is thus made, the forks Q and K connect the wires from $d$ and $e$ with the line. Now, at the same time, $h$ and 7 of P and $a$ and 1 of H are in contact, but do not receive a current while $e$ of Q and $b$ of H are in contact, but immediately they are separated the line is connected to $f$ of Q and $a$ of H, and they receive a current. Now, as both Z and Z' and W and W' are connected at the same time with the splits, it would seem that the waves would mix; but this is not the case, as the forks Q and K make twice as many vibrations per second as P or H. Hence, when both Z Z' and X X' at both ends are in connection with the splits $z z z$ and $x x x$, these splits do not receive the line simultaneously—first one split receives a wave, immediately afterward the other split receives a wave. Thus a wave passes through the line and signaling-instruments Z and Z', while no other instruments are receiving it. Immediately after another wave passes through X X', and no other instrument receives it. Now, when the prongs of P and H pass to the opposite points, connected to W and Y, it is obvious $z$ and $y$ cannot receive a wave, while W and W' will receive a wave, immediately followed by a wave, $y$ $y'$. Thus the line is first connected to Z and Z', then to X and X', then to Y and Y', and, lastly, to W and W', and so on, and, if the time of the various contact-points, as well as the forks, is the same, four series of waves, when all the keys are closed, will be sent over the wires, and each series will pass through its particular instrument, and through none other, and these waves, producing sufficient magnetism in the cores of the relay-magnet, cause it to close, and when one key is opened one series of waves is dropped out, and does not go over the wires, and the corresponding instrument at the distant station will receive no waves or electricity whatever. Hence its lever will be withdrawn from the face of the magnet by its retractile spring, and again attracted by closing the key and allowing the dropped series of waves to again pass over the line, and between each series of waves so sent the wire will be put to earth at both ends, and at several points along such wire waystations are inserted immediately after the cessation of one set of waves and before another commences, thus allowing the wire to discharge its static inductive current, and prevent a mutilation of the signals.

I do not wish to confine myself to any particular form of signaling-instrument, as either magnetical or chemical may be used. Polarized relays may be substituted for common relays, and the keys arranged to transmit reverse currents. Neither do I wish to confine myself to any particular shape of tuning-fork, or arrangement of contact-points, or method of keeping it in motion to accomplish this object, as innumerable combinations may be made by persons skilled in the art. Neither do I wish to confine myself to any particular method of signaling over the controlling-circuit without affecting the forks A and L, as the same may be duplexed, or the forks worked by a rise and fall of tension, and signaling done by reversing the direction of the current, and in various other ways. Neither do I wish to confine myself to any particular method of putting the line to earth between each series of waves, as this can obviously be done in many ways—as for instance, connecting the line to earth at each end before it enters the forks by a resistance-coil, the resistance of the same being made as low as will admit of, and still allow signaling. Neither do I wish to limit myself to the creation of four signaling-circuits, as a multiple fork, making twice as many vibrations as K and Q may have the line pass to it first; thence to K; then by the combination of two forks like H, one with the wires leading to Z′ Y′, and the other with the wires leading to X′ W′.

Eight series of waves may be made to pass over the wire, each series of which passes through its particular signaling-instrument and no other, the limit of subdivision being only a question of battery-power, delicacy of signaling-instruments, and accuracy of adjustment.

I will here mention that if ordinary relays are to be used they should be shunted, so as to cause their self-induction to circulate within its own wire, making the current more even for signaling.

I will also mention that several sets of transfer-forks may be included in the same local circuits at all the stations, and worked by the reeds or forks of the controlling-line, thus enabling me to split several lines in the manner described, by the use of only one controlling-line.

Of course, the same object would be attained by using several contact-points and local circuits.

I claim as my invention—

1. The method, substantially as herein described, of subdividing a single telegraphic circuit into two or more independent signaling-circuits by means of vibrating tuning-forks or reeds.

2. The method, substantially as herein described, of subdividing a single telegraphic circuit into two or more independent signaling-circuits by means of vibrating tuning forks or reeds kept in continuous vibration by electro-magnetism.

3. The method, substantially as herein described, of subdividing a single telegraphic circuit into four or more independent signaling-circuits by means of a primary or fundamental fork or reed, and one or more auxiliary forks or reeds, which latter are in respect to the number of their vibrations submultiples of the primary fork or reed.

4. The method, substantially as herein described, of subdividing a single telegraphic circuit into a number of separate signaling-circuits by means of one or more sets of electro-magnetic tuning forks or reeds, each set being composed of one or more forks or reeds, when these are controlled and made to vibrate isochronously by means of a controlling electro-magnetic tuning fork or reed, placed in another and independent circuit.

5. The method, substantially as herein described, of connecting a telegraph-line to earth immediately after it is detached from one set of signaling-instruments, and of disconnecting it from the same before it is placed in connection with another set of instruments.

6. A telegraphic circuit, subdivided at each station into an equal number of independent branches, in combination with two or more isochronous tuning forks or reeds, when the latter are so arranged as to place the main line alternately or successively in simultaneous connection with each pair of branches, substantially as set forth.

7. A telegraphic circuit subdivided at each station into an equal number of independent branches, in combination with two or more isochronous tuning forks or reeds, and two or more sets of electro-magnets for keeping the said forks or reeds in continous vibration, when the latter are so arranged as to place the main line alternately or successively in simultaneous connection with each pair of branches, substantially as set forth.

8. A telegraphic circuit subdivided at each station into four or more branches or signaling-circuits, in combination with a primary turning fork or reed, kept in continuous vibration by the action of the electro-magnets, and one or more similarly-actuated auxiliary forks or reeds, which in respect to the number of their vibrations are submultiples of the primary fork or reed, substantially as set forth.

9. A telegraphic circuit, subdivided at each station into two or more branches or signaling-circuits, by means of vibrating tuning forks or reeds, in combination with another and independent circuit, in which are placed other electro-magnetic tuning forks or reeds, so arranged as to control and render isochronous the vibrations of the tuning forks or reeds at the different stations upon the first-named circuit.

10. The vibrating tuning fork or reed K, in combination with the contact-springs 13 15, contact-points $c$ and $d$, and contact-screws 14 16, when so arranged that the line will be momentarily connected directly to the earth while the fork is passing its center of oscillation in either direction, substantially as set forth.

11. The combination of the transfer-reeds and their signaling-instruments, local circuit, and batteries with the main-line reed or reeds, substantially as and for the purpose set forth.

12. The tuning forks or reeds A and L, with their contact-springs, contact-points, and main battery, in combination with the signaling apparatus R and S, substantially as described, and for the purposes set forth.

13. The combination, in one and the same local circuit, of several set of transfer-forks at each of the different stations, substantially as and for the purposes set forth.

Signed by me this 16th day of August, A. D. 1876.

THOS. A. EDISON.

Witnesses:
GEO. D. WALKER,
GEO. T. PINCKNEY.